Figure 1:
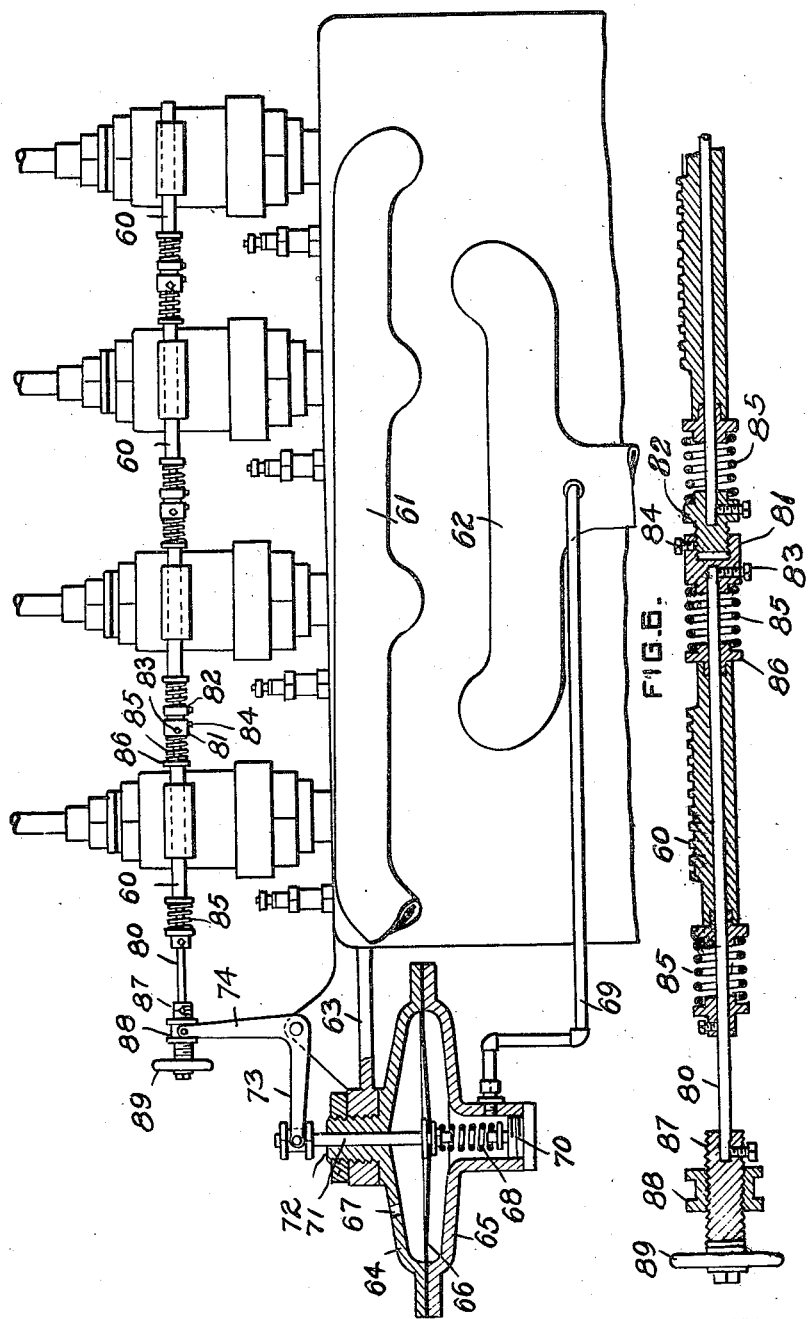

June 10, 1924.

E. V. BEALS

INTERNAL COMBUSTION ENGINE

Filed Dec. 31, 1919    2 Sheets—Sheet 2

WITNESSES
J. Herbert Bradley

INVENTOR
Erl V. Beals
By Jno S Green
Atty.

Patented June 10, 1924.

1,497,258

UNITED STATES PATENT OFFICE.

ERL V. BEALS, OF BOSTON, MASSACHUSETTS.

INTERNAL-COMBUSTION ENGINE.

Application filed December 31, 1919. Serial No. 348,606.

*To all whom it may concern:*

Be it known that I, ERL V. BEALS, a citizen of the United States, and a resident of Boston, in the county of Suffolk and State of Massachusetts, have made a new and useful Invention in Internal-Combustion Engines, of which the following is a specification.

This invention relates to internal combustion engines and more particularly to means for automatically injecting regulable quantities of water into the cylinders of such engines during combustion therein for increasing the thermal efficiency of such engines and otherwise improving the operation.

In an application filed by me on June 14, 1916, Serial No. 263,438, I have shown a water injecting device in which the pressure due to combustion in the engine cylinder operates upon a differential displacer to inject the water into the engine cylinder against the operating pressure and a separate device operated by such pressure for controlling the operation of the displacer element whereby the amount of water injected is regulated in accordance with said pressure.

In an application filed by me on May 28, 1919, Serial No. 300,401, I have shown an improvement on the device of said earlier application, said improved device being utilized in conjunction with an internal combustion engine which is without the usual water jacket and instead of being externally cooled is preferably lagged so as to retain the heat within the cylinder.

Since the heat units in each combustible charge taken into the cylinder or cylinders of an internal combustion engine for a given mixture vary as the torque of the engine varies and increases with each increase of the torque, and since I have found that more water is required when the indicator cards are large, that is, when the torque is large, regardless of whether this occurs at high or low speeds, I have found that by varying the amount of water injected in accordance with variations in the absolute pressure in the engine inlet manifold the proper regulation of the water injected will be obtained; and in multi-cylinder engines having a common inlet manifold I have found that by controlling the amount of water injected in accordance with the mean absolute pressure in the inlet manifold a satisfactory operation of the engine will be obtained.

An object of this invention is to provide means for utilizing the pressure due to combustion for forcing water into the engine cylinders during combustion therein and for controlling the amount injected in accordance with variations in the absolute pressure in the engine inlet manifold.

This, as well as other objects which will readily appear to those skilled in this particular art, I attain in the device described in the specification and illustrated in the drawings accompanying the same and forming a part of this application and throughout which similar elements are denoted by like characters.

Figure 2:
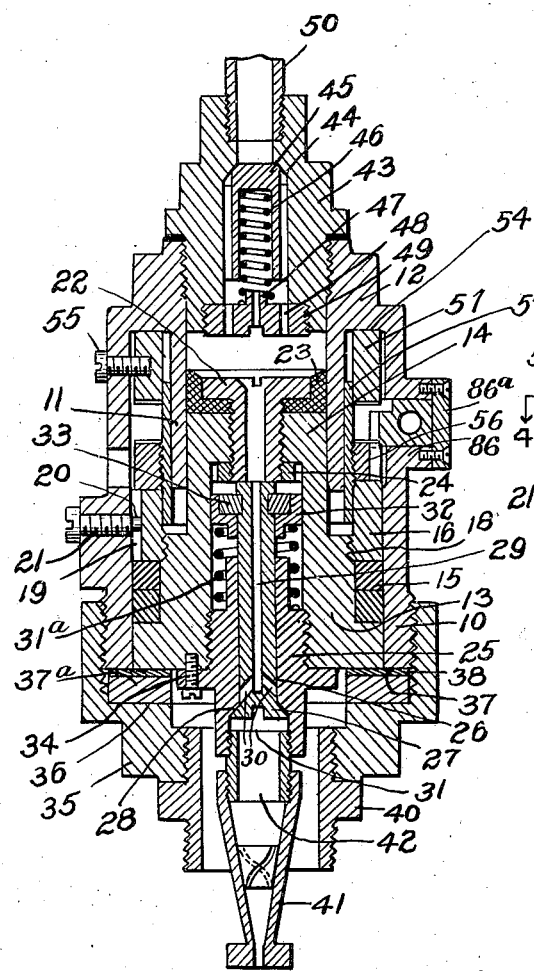
Figure 3:
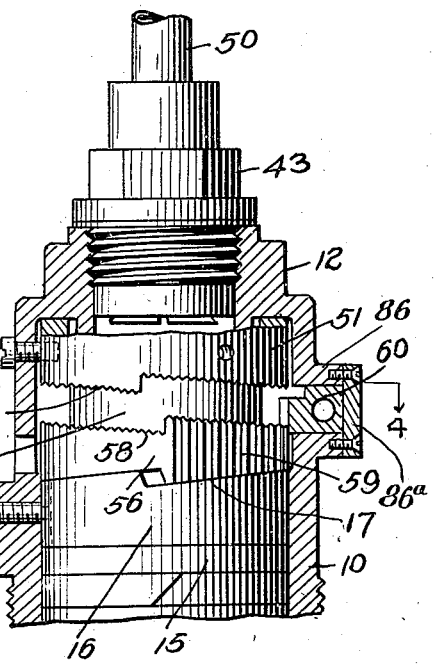
Figure 4:
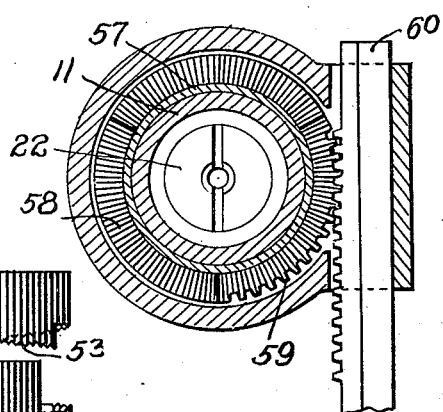
Figure 5:
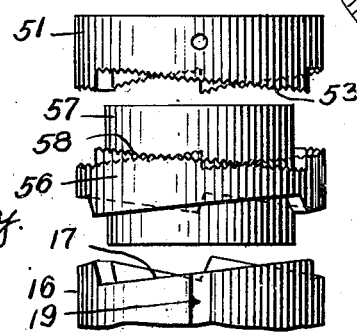

In the drawings Figure 1 is a more or less diagrammatic illustration of a four cylinder internal combustion engine equipped with this invention; Fig. 2 is a sectional elevation of one of the water injecting devices shown in Fig. 1; Fig. 3 is a fragmentary view partly in elevation and partly in section of the device of Fig. 1; Fig. 4 is a cross sectional view taken on line 4—4 of Fig. 3 looking in the direction of the arrow; Fig. 5 is a view in elevation of the cooperating wedge members used for limiting the movements of the displacer element and Fig. 6 is an enlarged view of a portion of the mechanism for connecting up the movable wedge member to the device for controlling its operation in accordance with the inlet manifold absolute pressure.

Since the injection devices for the different cylinders are the same, a description of one will suffice and one of these, as shown in Figs. 2 to 4, inclusive, consists of a shell or housing 10 bored internally and provided with an annular flange 11 depending from the head portion 12 of the shell. The flange is externally and internally finished on surfaces concentric with the main bore of the shell. A displacer element 13, at its lower end fitted to slide within the bore of the shell, is reduced at its upper end 14 so as to fit the internal bore of annular flange 11.

The lower or larger part of displacer 13 is provided with metallic packing rings 15 held in place by means of a nut 16, the upper surface of which is machined so as to present three equal cam or wedge faces 17. Nut or wedge member 16 at 18 is threaded onto displacer member 13 and at one or more places in its outer surface is provided with longitudinally extending slots 19 within which the reduced end 20 of a guiding screw 21 is adapted to lie so as to prevent rotation of the displacer element during its reciprocations.

Displacer element 13 is centrally bored and at its upper end carries a cup-leather packing 23 held in place by means of a hollow retaining screw 22 threaded into the upper tapped end of the central bore of the displacer member and lock nut 24 is threaded to the inner end of screw 22 for locking the same in place.

One element 25 of a water discharge valve is threaded into the lower tapped end of the central bore of the displacer element. Element 25 is centrally bored to receive a valve stem 26 which carries at its lower end a valve 27 cooperating with a seat 28 formed in element 25. Valve stem 26 is provided with a central opening 29 for the passage of water and this communicates with outlets 30 through which water passing through the valve stem is discharged into space 31 when valve 27 is unseated.

Valve 27 is normally held to its seat by means of a coiled spring 31ᵃ which surrounds the upper reduced end of valve element 25 and bears at its upper end against a collar 32 secured to the upper end of valve stem 26 by means of a split washer 33 as is now common in certain constructions. A screw 34 is utilized for preventing valve member 25 from turning out of its threads in displacer element 13. Shell 10 at its lower end is externally threaded to receive a cap 35 and between the inner face 36 of the cap and the lower end 37 of the shell two buffer elements 37ᵃ and 38 are located. These are annular ring-like washers and are preferably made from material such as fiber, vulcanite or bakelite (a phenolic condensation product) for more or less cushioning the return or inner movements of the displacer element 13. Cap 35 is provided with a threaded bore adapted to receive a connecting nipple 40 for connecting the device to the cylinder of the engine and a spray nozzle 41 of any desired construction is connected to the outlet of valve member 25 by means of a short nipple 42.

The upper end of shell 10 which is bored through is tapped to receive a plug 43 which forms the body of a non-return valve device. The plug is provided with a seat 44 with which a valve plunger 45 cooperates. Plunger 45 is bored out to receive a coiled spring 46 which at its lower end encircles a tip 47 of a nut 49 threaded into the lower end of plug 43 and which is provided with through openings 48 for the passage of water. By means of suitable piping 50 the device is adapted to be connected with a source of supply of water under sufficient pressure to move displacer element 13 outwardly into contact with buffer element 38 at the end of the expansion strokes of the engine or during the exhaust strokes.

A wedge or cam member 51, annular in form, lies between annular flange 11 and shell 10 and has its lower face formed in the nature of three identical cam or wedge surfaces 53 provided with fine serrations as shown in Figs. 3, 4 and 5. This cam member 51 is held in fixed position against end surface 54 of the shell by means of a plurality of screws 55 arranged around the shell, only one of which is shown.

Lying between cam members 16 and 51 is a slidable and revolvable cam member 56. This is annular in form and is rigidly secured by means of screw threads to a sleeve 57 which slides on the outer cylindrical surface of annular flange 11 and between said surface and the inner cylindrical surfaces of cam members 16 and 51. The lower face of cam member 56 is provided with three identical cam surfaces adapted to cooperate with cam surfaces 17 of cam member 16. The upper face of cam member 56 is provided with three identical cam surfaces 58 serrated in the same manner as cam surfaces 53 and arranged to cooperate with the serrations of said cam surfaces 53.

A portion of the outer cylindrical surface of cam member 56 is provided with gear teeth 59 and with these the teeth of a rack member 60 mesh. Rack member 60 is adapted to slide at right angles to the axis of displacer member 13 and in so doing will rotate cam member 56 and cause its lower cam faces to ride on cam faces 17 of cam member 16, thereby varying the effective distance between cam member 16 and cam member 51.

Rack member 60 is adapted to be connected to a device which will reciprocate the same in response to changes in the absolute pressure in the inlet manifold of the engine to which the device is attached whereby the travel of the displacer element on its displacement strokes is varied and limited in accordance with the absolute pressure in the inlet manifold and therefore in accordance with the weight of the charge in the engine cylinder.

In Fig. 1 an internal combustion engine is diagrammatically illustrated. This represents a four cylinder engine having an exhaust manifold 61 and an inlet manifold 62.

Attached to the engine at a convenient place by means of a bracket 63 is a housing made up of two parts 64 and 65 between which parts a flexible diaphragm 66 is confined. The upper portion of the diaphragm by means of a port 67 is subjected to atmospheric pressure while beneath the diaphragm a coiled spring 68 is located. The space beneath the diaphragm by means of piping 69 is connected to the inlet manifold.

An adjustable abutment 70 is provided for spring 68 for varying the tension of the spring.

A rod 71 carried by the diaphragm projects through a guide 72 and has its upper end slidably connected with one arm 73 of a bell-crank lever, the other arm 74 of which is slidably connected to the section of a rod composed of sections 80 which, through suitable mechanism hereinafter described, connects with all of the rack members 60 for the four water injection devices.

The movement of sectional rod 80, and, therefore, the rack members, depends upon the difference between atmospheric pressure and the absolute pressure in the inlet manifold and as the absolute pressure in the inlet manifold closely corresponds to the torque developed by the engine and therefore the weight of the charges taken into the engine cylinders, the water injected by the several injection devices will be varied in accordance with variations in the mean absolute pressure in the inlet manifold and the atmospheric pressure. The greater the weight of the charges the greater will be the amount of water injected and the less the weight of the charges the less amount of water will be injected. This follows since the greater the weight of the charges the less vacuum there is in the cylinders or in the inlet manifolds at the end of the suction strokes and the lighter the charges the greater will be the vacuum in the cylinders or inlet manifolds at the end of the suction strokes. It will be understood that the device is so arranged that at full load or maximum weight of charge cam member 56 will be in its lowest position thereby allowing the greatest movement to the displacer element thus accomplishing the maximum water injection for which the device is designed.

It will be noted that the normal position of the diaphragm 66 may be varied by adjusting the tension of the spring 68 by means of abutment 70. Therefore the diaphragm 66 may be adjusted to correspond to the different atmospheric pressures and the throw or movement of the rods 80 maintained constant for a given pressure in the manifold 62. It may also be desired in some atmospheric pressures and conditions to lessen the amount of water entering the engine cylinders and this may be done by adjusting the spring 68 to vary the position of the diaphragm 66 and consequently vary the movement of the rods 80 operating the racks 60.

Since during the operation of a multi-cylinder engine under varying loads or torques sectional rod 80 may be caused to move during the time the cam members of one of the water injection devices utilized may be locked due to the interengagement of the serrated cam surfaces it has been found necessary to provide more or less flexible connections between said sectional rod 80 and the different rack members 60 and these connections are illustrated in Fig. 6 in which these sections of rod 80 are shown connected together by means of connectors made up of two parts 81 and 82 to which the opposite ends of the short rods 80 are secured by means of locking screws 83. Members 81 and 82 are threaded together and locked in adjusted position by means of a set screw 84. Rack members 60 are bored out so as to slide on rods 80 and are held in proper position on said rods by means of coil springs 85 which lie between connecting members 81 and 82 and collars 86 which abut against the ends of the rack members. Since the rack members are squared and slide within squared rack channels and are held in place by means of plates 86ª they are prevented from turning on rods 80.

From this construction it will be seen that should one of the rack members be locked against movement the springs on opposite sides thereof will permit the other rack members of the series to be operated independently of the locked rack by means of the diaphragm device and such locked rack as soon as unlocked will, by means of its springs, be brought to that position which it would have assumed had it not been locked.

For the purpose of attaining the proper initial adjustment or position of the several racks the connecting members 81 and 82 may be turned into or out of one another and locked in proper position by means of set screws 84 and adjustment is provided for changing the setting of all of the cam devices 56 of the series of water injection devices during operation of the engine and this consists of a threaded member 87 rigidly connected to sectional rod 80, a collar member 88 threaded to member 87 and within which arm 74 of the bell-crank lever slidably lies. The arm of the bell-crank lever prevents rotation of collar member 88 and by means of a hand wheel 89 sectional rod 80 may be longitudinally adjusted with relation to collar member 88 therefore varying the throw of the sectional rod 80 and thus the limits of movement of the cam members 56.

If desired sectional rod 80 may be a through rod and members 81 and 82 may be secured thereto by means of the set screws and not threaded together so that they may be adjusted to and locked in different positions along the rod to accomplish the unit or individual adjustment of the different rack members.

In utilizing this device if the engine is of of the ordinary type provided with a water jacket the water may be omitted and if the engine is to be designed for the device it will preferably be designed without a water jacket and lagged as is now done with steam engines to conserve the heat rather than to dissipate it.

The engine will be provided with the usual ignition devices and in Fig. 1 I have shown the ordinary spark plugs adapted to be connected with a suitable source of timed electric discharges.

Two carbureters will preferably be employed, or, if desired a single carbureter capable of alternately feeding two kinds of fuel, one readily inflammable for starting and heating up the engine and one not readily inflammable such as kerosene or distillate upon which the engine will operate after the warming up period.

As the torque on the engine during the warming up period will be light practically no water will be injected but when the engine is warm and the torque increases the water injected will increase in accordance therewith as the amount will depend upon the absolute pressure in the inlet manifold which absolute pressure will vary as the engine throttle is varied and therefore as the torque varies.

In accordance with the provisions of the patent statutes I have described the principle of the operation of my invention, together with the device which I now consider to represent the best embodiments thereof, but I desire to have it understood that the device shown is only illustrative and that the invention can be carried out in other ways.

Having thus described my invention what I claim is—

1. In combination with an internal combustion engine, means operated by the pressure due to combustion for injecting water into the combustion chamber thereof, and means constructed and arranged to be operated by the differential between atmospheric pressure and the absolute pressure in the engine inlet manifold for controlling the amount of water injected.

2. In combination with an internal combustion engine, means operated by the pressure due to combustion for injecting water into the combustion chamber thereof, means for controlling the amount of water injected by said first named means, and means constructed and arranged to be operated by the differential between atmospheric pressure and the absolute pressure in the engine inlet manifold for operating said second named means to vary the amount of water injected.

3. In combination with an internal combustion engine, a displacer member operated by the pressure due to combustion for injecting water into the combustion chamber of the engine, means for limiting the movement of said displacer member, and means for operating said first named means to vary its effectiveness in limiting the movement of said displacer member, said last named means being constructed and arranged to be operated by the differential between atmospheric pressure and the absolute pressure in the engine inlet manifold.

4. In combination with an internal combustion engine, a differential displacer device for injecting water by means of the pressure due to combustion into the combustion space of the engine, means for limiting the displacement movement of said displacer device, and means for varying the limiting effect of said first named means, said last named means being constructed and arranged to be operated by and dependent upon the differential between atmospheric pressure and the absolute pressure in the engine inlet manifold.

5. In combination with an internal combustion engine, a differential displacer device utilizing the pressure due to combustion for injecting water into the combustion space of the engine during combustion therein, mechanism for limiting the movement of said displacer, and means the operation of which is dependent upon the differential between atmospheric pressure and the absolute pressure in the engine inlet manifold for governing the operation of said mechanism in limiting the movement of the displacer.

6. The combination with an internal combustion engine, of a water injection device, comprising a reciprocating differential displacer element, co-operating cam members axially alined with said displacer element, means for rotating one of said cam members to vary the effective movement of said displacer element, and means for operating said first named means, said last named means being operated by and dependent upon the differential between atmospheric pressure and the absolute pressure in the engine inlet manifold.

7. In a water injection device, a reciprocating differential displacer element, a plurality of cam members axially alined with said displacer element, one of said cam members being rotatably mounted relative to and adapted to co-operate with the other of said cam members, and means for rotating said rotatable cam to vary the effective movement of said displacer element.

8. A water injecting device comprising a shell member, a displacer element mounted for reciprocable movement in said shell, a plurality of cam members axially alined with said displacer element, one of said cam members being rotatably mounted relative to and adapted to co-operate with the other of said cam members, said rotatable cam being provided with gear teeth around a portion of its periphery and a rack in engagement with said gear teeth and adapted to be reciprocated to rotate said cam to thereby vary the effective movement of said displacer element.

9. The combination with an internal combustion engine, of a water injection device, a differential displacer element in said device reciprocable by pressure due to combustion on its injection stroke, rotatable means axially alined with said displacer element for controlling the extent of movement of the displacer element on its injection strokes, and means operated by the differential between the atmospheric pressure and the absolute pressure in the engine inlet manifold for operating said first named means.

10. The combination with an internal combustion engine, of a water injection device, a differential displacer element in said device reciprocable by pressure due to combustion on its injection stroke, a plurality of cam members axially alined with said displacer element, one of said cam members being rotatably mounted relative to and adapted to co-operate with the other of said cam members, said rotatable cam being provided with gear teeth around a portion of its periphery, a rack in mesh with said gear teeth, and adapted to be reciprocated to rotate said cam to thereby vary the effective movement of said displacer element, and means operated by the differential between the atmospheric pressure and the absolute pressure in the engine inlet manifold for automatically reciprocating said rack.

In testimony whereof, I have hereunto subscribed my name this 18th day of December, 1919.

ERL V. BEALS.